United States Patent
Hill et al.

(10) Patent No.: US 12,334,626 B2
(45) Date of Patent: Jun. 17, 2025

(54) HIGH MAST WIRELESS APPARATUS TO PROVIDE WI-FI AND HIGH SPEED BACKHAUL SERVICES

(71) Applicant: Buckeye Mountain, Inc., Akron, OH (US)

(72) Inventors: Steve Hill, Akron, OH (US); Greg Dunnell, Akron, OH (US)

(73) Assignee: Buckeye Mountain, Inc., Akron, OH (US)

( * ) Notice: Subject to any disclaimer, the term of this patent is extended or adjusted under 35 U.S.C. 154(b) by 286 days.

(21) Appl. No.: 17/835,181

(22) Filed: Jun. 8, 2022

(65) Prior Publication Data

US 2023/0009046 A1    Jan. 12, 2023

Related U.S. Application Data

(60) Provisional application No. 63/220,879, filed on Jul. 12, 2021.

(51) Int. Cl.
| | |
|---|---|
| *H01Q 1/24* | (2006.01) |
| *F21S 8/08* | (2006.01) |
| *F21V 33/00* | (2006.01) |
| *H01Q 1/06* | (2006.01) |
| *H01Q 1/32* | (2006.01) |
| *H01Q 21/06* | (2006.01) |
| *H04B 7/0413* | (2017.01) |

(52) U.S. Cl.
CPC ............. *H01Q 1/246* (2013.01); *F21S 8/085* (2013.01); *F21V 33/006* (2013.01); *H01Q 1/06* (2013.01); *H01Q 1/3275* (2013.01); *H01Q 21/065* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 10,405,407 B2 | 9/2019 | Chalmers et al. | |
| 2020/0364187 A1* | 11/2020 | Tran .................. | G06N 3/02 |
| 2021/0092702 A1* | 3/2021 | Kenington ........... | H04B 7/06 |

* cited by examiner

*Primary Examiner* — Frantz Bataille
(74) *Attorney, Agent, or Firm* — Nixon & Vanderhye P.C.

(57) ABSTRACT

A communications apparatus to be installed on high mast lighting systems or other vertical assets with significant above ground projections. The apparatus is designed to mount to existing light ring spokes or other existing mounting structures. The system is powered during nighttime hours by grid power and during daylight hours by internal battery storage. A uniquely-oriented directional dual polarity MIMO antenna adapted for high mast mounting supports communications with mobile vehicles using MIMO emissions in a North/South and East/West polarization. Mobile vehicle clients may then use dual polarized antennas including skyward-looking radiation patterns with major lobes that are oriented directly up towards the sky.

20 Claims, 10 Drawing Sheets

Example RapidSky Embodiment

FIG. 1
(PRIOR ART)

FIG. 2
Example RapidSky Embodiment

FIG. 3
Example Communication Between Rapidsky Units

HIGH MAST WIRELESS APPARATUS TO PROVIDE WI-FI AND HIGH SPEED BACKHAUL SERVICES

CROSS-REFERENCE TO RELATED APPLICATIONS

The present application claims benefit of Application No. 63/220,879 filed Jul. 12, 2021, which is incorporated herein by reference in its entirety and for all purposes.

FIELD

This disclosure generally relates to a communication device, and more specifically relates to an apparatus that can be installed on high mast vertical assets while overcoming challenges in providing continuous reliable wireless services for ground based moving clients and other high throughput requirements.

BACKGROUND & SUMMARY

Figure 1:
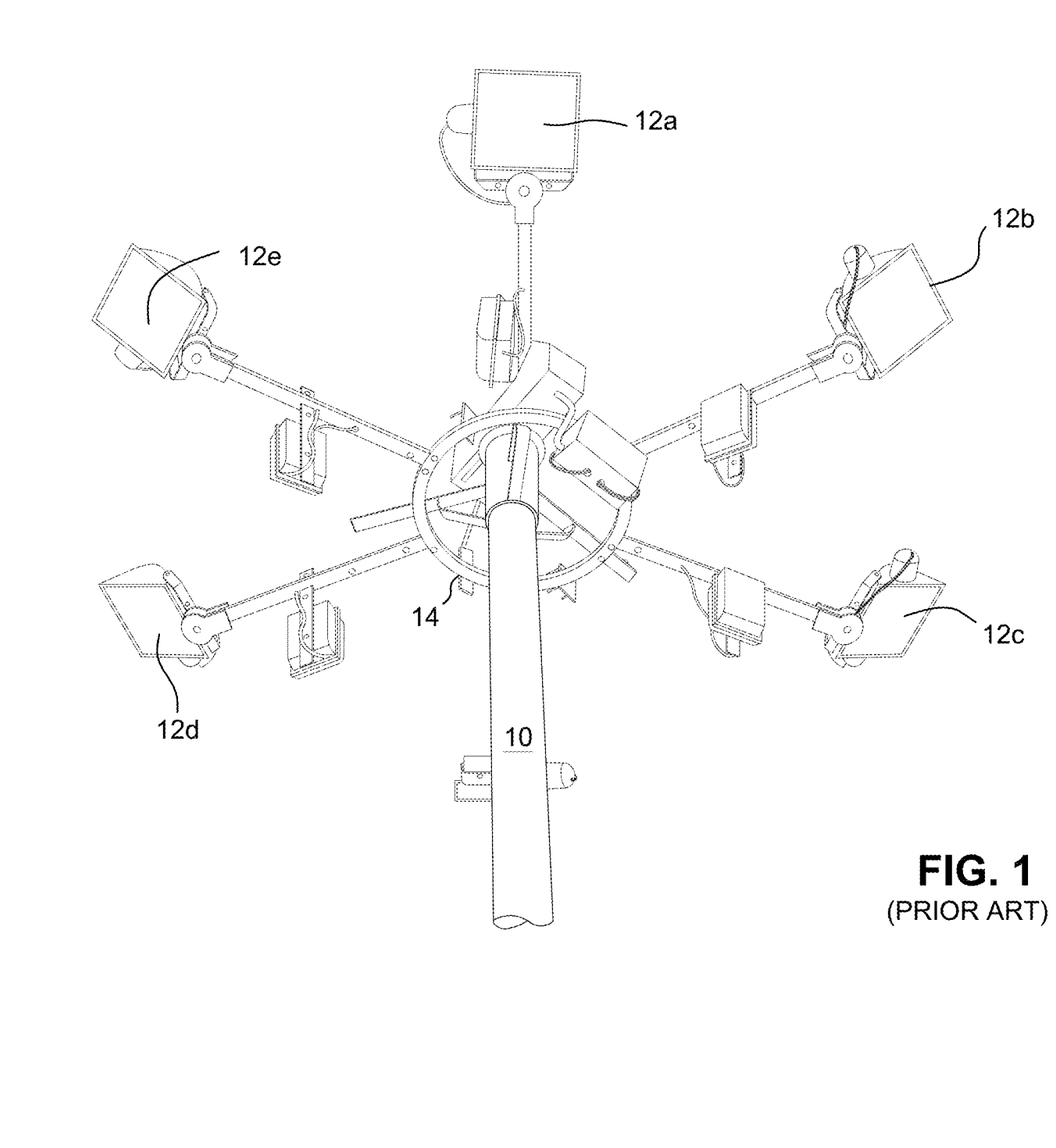
FIG. 1 shows a prior art high mast lighting system.

High mast lighting is a type of site light fixture that is commonly used to illuminate large areas from a very high mounting height for storage, transportation, and pedestrian use and safety. High mast lighting fixtures are typically mounted on masts 10 that are 40 feet to 150 feet tall, with four to 16 light fixtures 12 mounted on each mast in a hub-and-spoke configuration around a light ring 14. See FIGS. 1 and 3.

High mast lighting systems or associated vertical assets are used in many different ways, including area lighting and providing an installation location for various devices supporting technologies including video surveillance and wireless access. This type of outdoor lighting is often used by municipalities, ports, municipal authorities, railway yards, and in parking lots of large venues such as stadiums and sports facilities. A particular advantageous use is in ports, where the high masts are used to illuminate between containers. Other high lighting could be used on the gantry cranes, on the sides of buildings, etc. in a large outdoor deployments.

Because of the height of the masts used to mount such lighting, the masts would seem to be ideal mounting locations for UHF radio transceiving equipment such as wireless access points (APs). High frequency RF signals are typically most effective in line of sight. By mounting radio transceiving equipment at the top of a high mast, it would seem to be possible to achieve a wide coverage area since the transceiving equipment mounted on the top of a tower can "see" a wide area without any line-of-sight obstructions.

However, many wireless systems on the market today are not designed to overcome the radio frequency technical challenges presented by installations at such high above-ground altitudes and intermittent grid power supplies. Typically, wireless installations, especially Wi-Fi (802.11a, 802.11n, 80211ac, etc.) access points, on high masts use omni directional or directional antennas providing RF gain and radiation pattern major lobes to the horizon. This subjects the access points to interference from other access points installed on adjacent masts and even from neighboring terrestrial networks miles away. Even more significantly, the area directly below the installation point near the mast suffers from reduced RF gain as the area falls within the null of the access point's antenna radiation pattern. Some installers have tried to solve the problem by increasing antenna gain, but this tends to make the interference issues even worse.

In order to attempt to mitigate these RF challenges, some installers have used directional antennas with down-tilt with limited success. In this context, "down tilt" involves beam steering (either electronically or mechanically or both) to aim the major lobe(s) of the antenna radiation pattern at a lower angle than horizontal. However, directional antennas have a potential disadvantage depending on where the antennas are located relative to a coverage area, and may require a large number of antennas with corresponding overlapping coverage areas to provide wide coverage of a large area such as a railroad or shipping yard, sports stadium, parking lot, etc.

Moreover, mobile clients, such as vehicle mounted systems, typically use omnidirectional antennas such as vertical whip antennas as the mobile clients' apparent heading changes regularly in their travel. These mobile antennas also typically have gains and radiation patterns generally in the direction of the horizon. The radiation pattern of a vertical whip antenna is generally at a maximum in the horizontal direction and falls to near zero along the vertically-oriented axis of the antenna, which may be the direction of antennas mounted on high masts. As they approach a fixed installation on these high masts, mobile client antennas thus often suffer from low or negative gain to/from the sky.

Thus, traditional wisdom is to install WiFi access points at a height of around 35 feet to provide horizontal radiation patterns to blanket a coverage area. Nevertheless, there is a demand to make use of the same tall masts 10 used to mount lighting fixtures 12 to also support wireless access points.

The light ring 14 typically can be lowered and raised for maintenance of the lights 12 and other components—which means that any other components such as switching or control devices, wireless access points, etc. should generally all be mounted to the light ring 14. In particular, if other items such as wireless access points were to be mounted directly to the mast 10 at an intermediate position, such installations would mechanically interfere with raising and lowering the light ring 14. Accordingly, further improvements are possible.

DETAILED DESCRIPTION OF NON-LIMITING EMBODIMENTS

One example embodiment is the unique orientation of a directional dual polarity MIMO antenna adapted for high mast mounting, that supports communications with mobile vehicles. Unlike common deployments which use vertically and horizontally polarized RF emissions aimed at the horizon or slightly down-tilted, example embodiments orient the antenna directly down towards the surface of the earth. This results in MIMO emissions being produced in a North/South and East/West polarization. Mobile vehicle clients may then use dual polarized antennas including skyward-looking radiation patterns with major lobes that are oriented directly up towards the sky.

Some embodiments provide a communications system specifically designed, adapted and configured to install on a high mast lighting system directly on an existing spoke typically used for a light fixture.

Other embodiments provide the ability of a system to operate for at least 24 hours without grid power to compensate for the intermittent nature of centrally controlled lighting systems.

Example High Mast Installation

Figure 2:
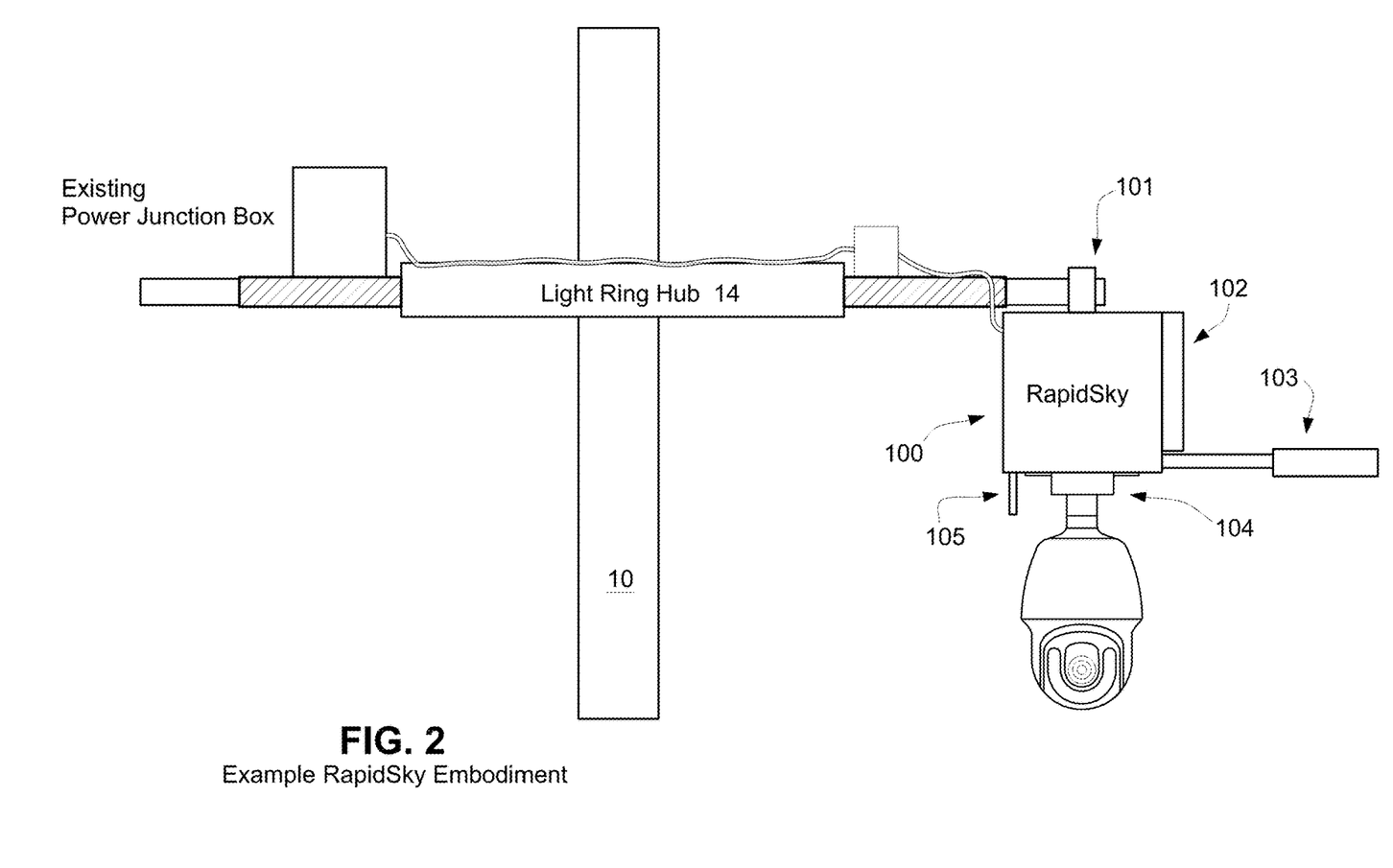
FIG. 2 shows an example non-limiting mast-top installation.

FIG. 2 shows an example non-limiting embodiment providing a connectivity installation 100 on a light ring hub 14 atop a mast 10. The installation 100 includes a rotatable split yoke 101 adapted and configured to be bolted onto and retained by a standard 2-inch horizontal lighting spoke pipe designed to retain a standard conventional light fixture 12. Installation 100 is further designed to use the power (e.g., typically 480 VAC) provided by the light ring hub 14 to a conventional lighting fixture 12. The installation 100 includes a mesh radio 102, a WiFi access point 103, and an optional Ethernet equipment/camera 104.

Figure 3:
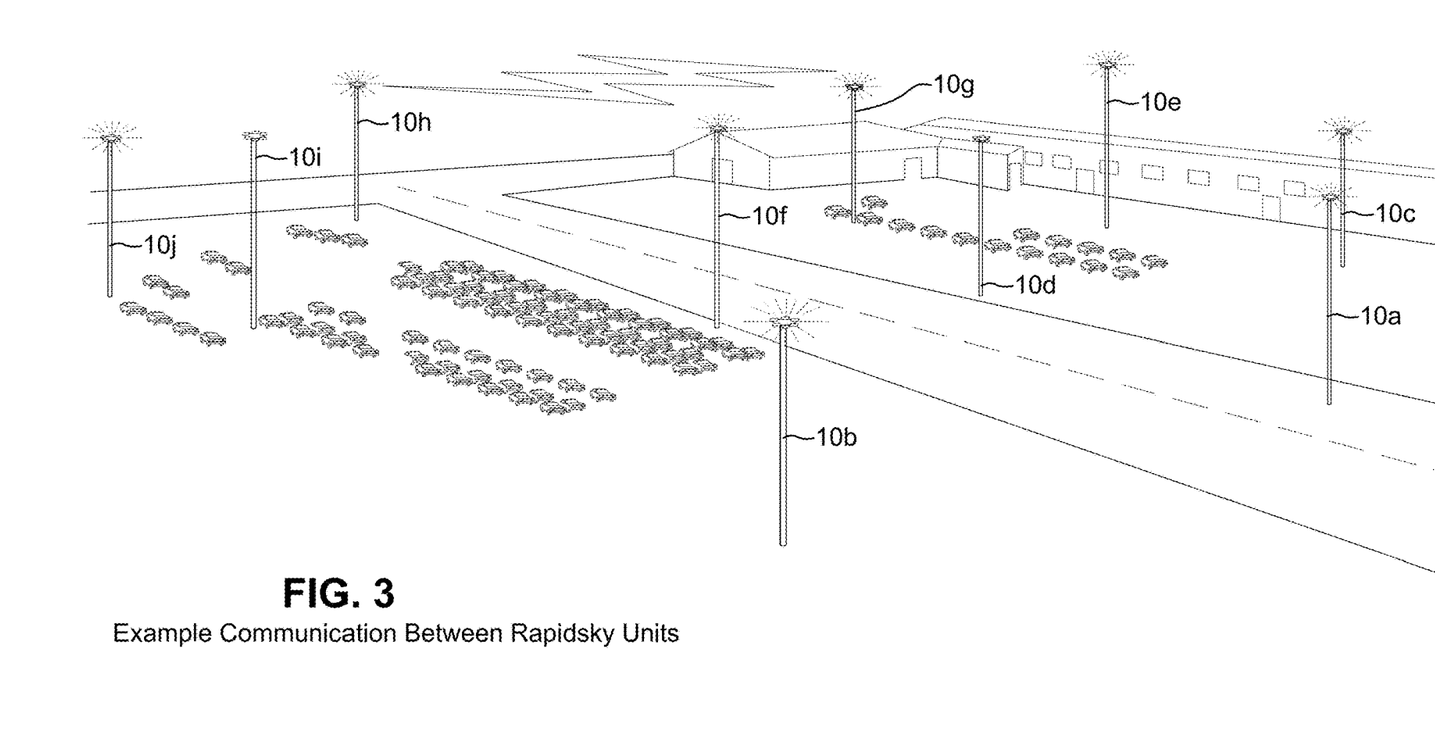
FIG. 3 shows an example mesh communication between mast-top installations.

As shown in FIG. 3, the mesh radio 102 may be used to provide communications between installations 100 at the top of various masts 10 in light of sight proximity to one another. The mesh radio 102 in one embodiment may operate at 60 MHz and provide a conventional horizontal radiation pattern to provide reliable communications between mast-top-mounted installations 100 all at the same or nearly the same height.

Figure 4:
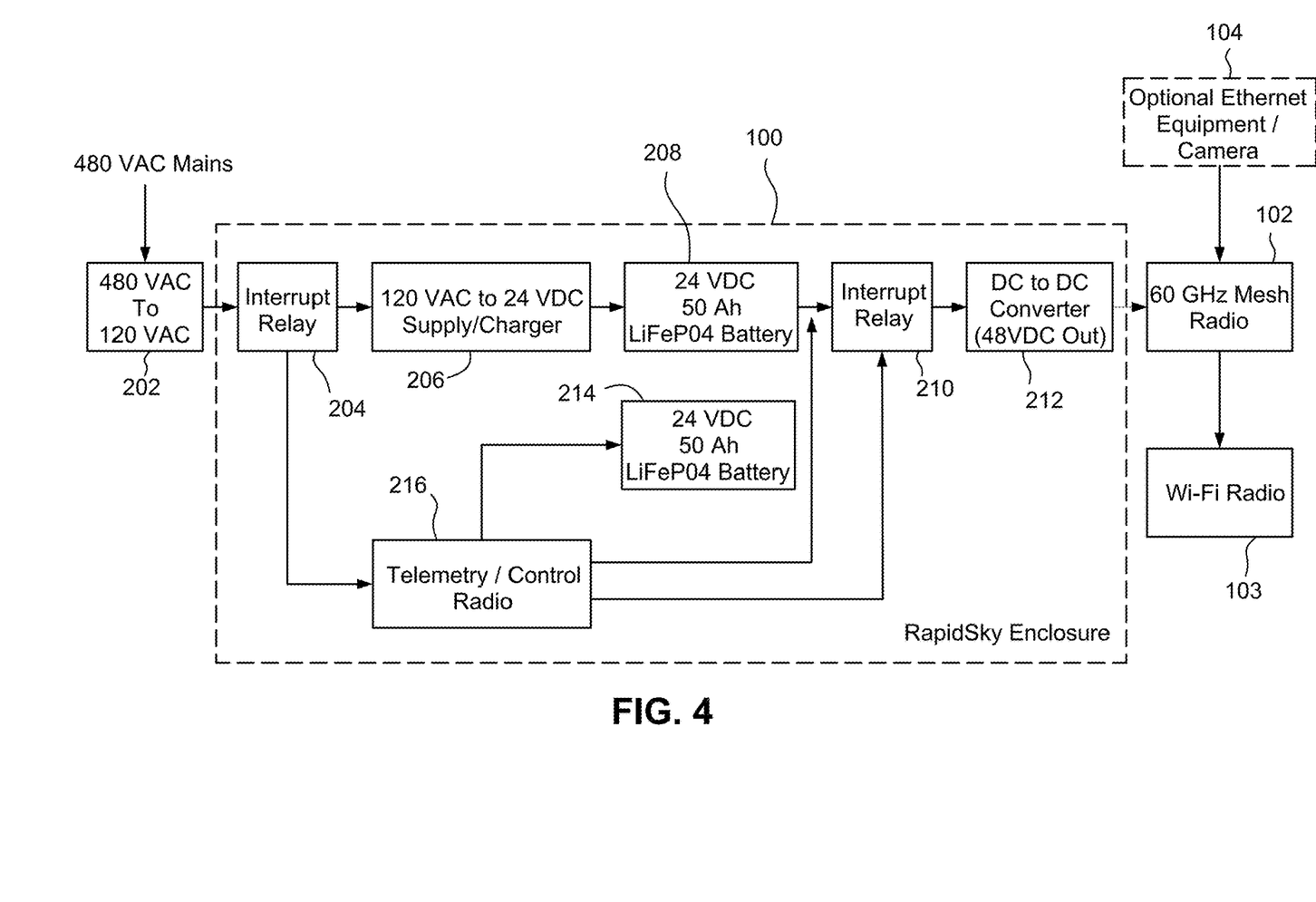
FIG. 4 is an example non-limiting block diagram.

FIG. 4 shows a block diagram of an example installation 100, which includes a voltage downconverter (transformer) 202 reducing the incoming voltage from 480 VAC to 120 VAC (this transformer may be external of a housing/enclosure and mounted to the mast spoke pipe in one embodiment), a further voltage supply/battery charger 206 that converts 120 VAC to 24 VDC for charging one or more batteries 208, 214 to provide power to the radio communications systems when power to the light fixtures 12 is off (e.g., during daylight hours), and a DC to DC voltage converter 212 that upconverts the DC voltage to 48 VDC for use by mesh radio 102, Wi-Fi radio 103 and Ethernet equipment/camera 104. A telemetry/control radio 216 using antenna 105 provides remote wireless control (from ground) switching/operation of interrupt relays/contactors 204, 210. The 60 MHz mesh radio 102 may provide auto-aiming antenna systems to provide fiber-equivalent backhaul communications network between a mesh of other installations 100 in a group or "forest" of masts 10 and ultimately with one or more ground or other terrestrial stations.

Figure 10A:
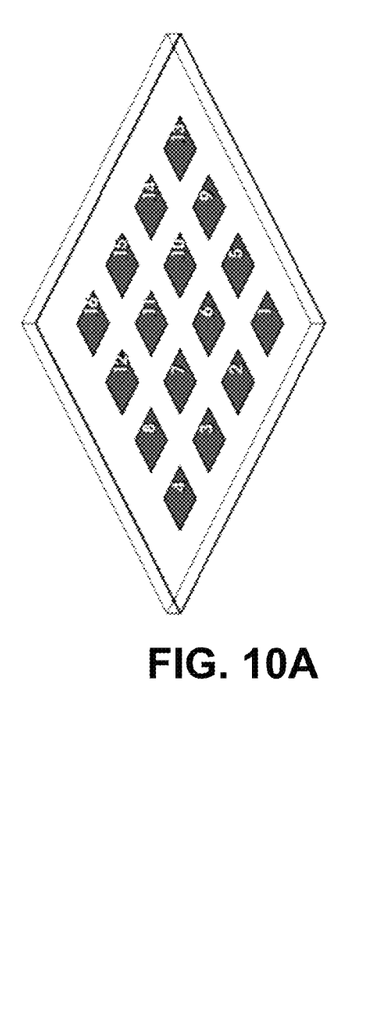
FIG. 10A shows an example orientation for an access point 16-element MIMO patch antenna array.

In example embodiments, the WiFi access point 103 can comprise a conventional WiFi access point including a wireless chip and a controller, along with one or more conventional beamforming MIMO patch antennas (see FIG. 10A). However, in the example embodiments, the MIMO patch antennas are provided in a unique orientation of a directional dual polarity MIMO antenna adapted for high mast mounting, that supports communications with mobile vehicles. Unlike common deployments which use vertically and horizontally polarized RF emissions aimed at the horizon or slightly down-tilted, example embodiments orient the MIMO antenna array directly down towards the surface of the earth (i.e., the array is aimed to the earth's poles instead of to the earth's horizon as in a conventional access point installation in most buildings, homes, etc.). This results in MIMO emissions being produced in a North/South and East/West polarization. Mobile vehicle clients may then use dual polarized antennas including skyward-looking radiation patterns with major lobes that are oriented directly up towards the sky. In the example shown, the access point 103 is mounted on a horizontal extension projecting from the housing 100 in order to prevent the camera 104 from shadowing the radiation pattern of the access point, but in other embodiments where a camera is omitted the access point could be mounted on the bottom of the housing looking downward.

Figure 6:
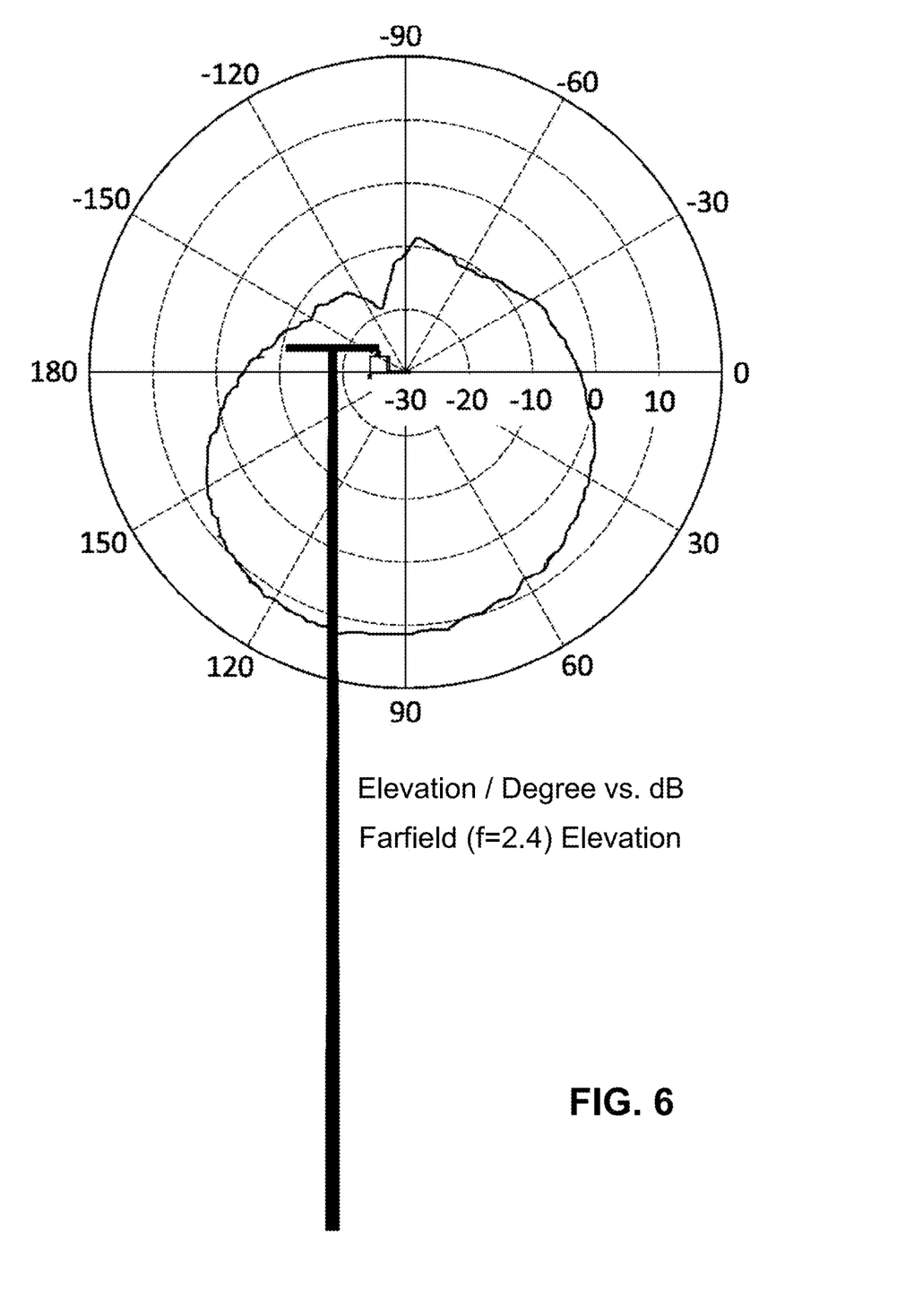
FIG. 6 is a Smith chart of an example radiation pattern of a mast-mounted access point.

FIG. 6 shows an example Smith chart of an exemplary radiation pattern of the mast-mounted WiFi access point 103. In the example shown, the access point 103 extends outwardly from the camera 104 so as not to be obstructed by the camera in a downward direction. As shown in FIG. 6, the major lobe of the access point 103's radiation pattern is in a generally downward direction with appreciable gain (e.g., +10 dB) downward between 60 degrees and 135 degrees and much lower signal strength (e.g., 0 dB to −10 dB) in horizontal and upward directions. This focusing or concentration of the major lobe of the antenna's radiated signal strength in a generally downward direction provides line-of-sight coverage for mobile stations beneath the penumbra of the poles 10.

Figure 8:
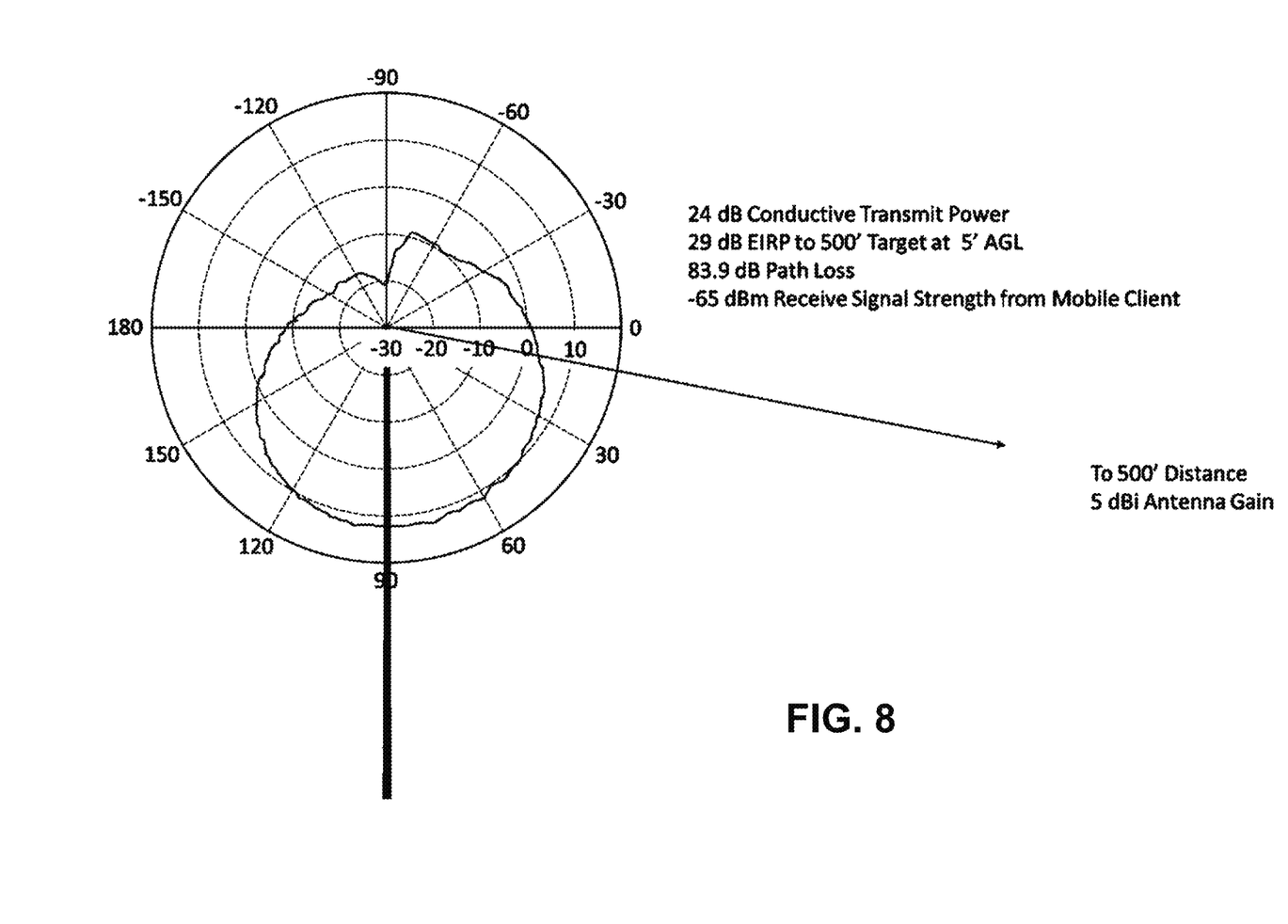
FIGS. 8 and 9 together show line of sight communication between a mast-mounted access point (FIG. 8) and a hosteler-mounted mobile antenna (FIG. 9).

FIG. 8 shows example parameters for communication with a mobile antenna such as 24 dB conductive transmit power, 29 dB EIRP to a 500-foot target at 5 feet AGL, an 83.9 dB path loss, and a −65 dBm receive signal strength from a mobile client. Such parameters can be achieved by mounting the patch antenna vertically rather than its typical horizontal orientation, and using additional mechanical and/or electrical beamforming techniques.

Figure 5:
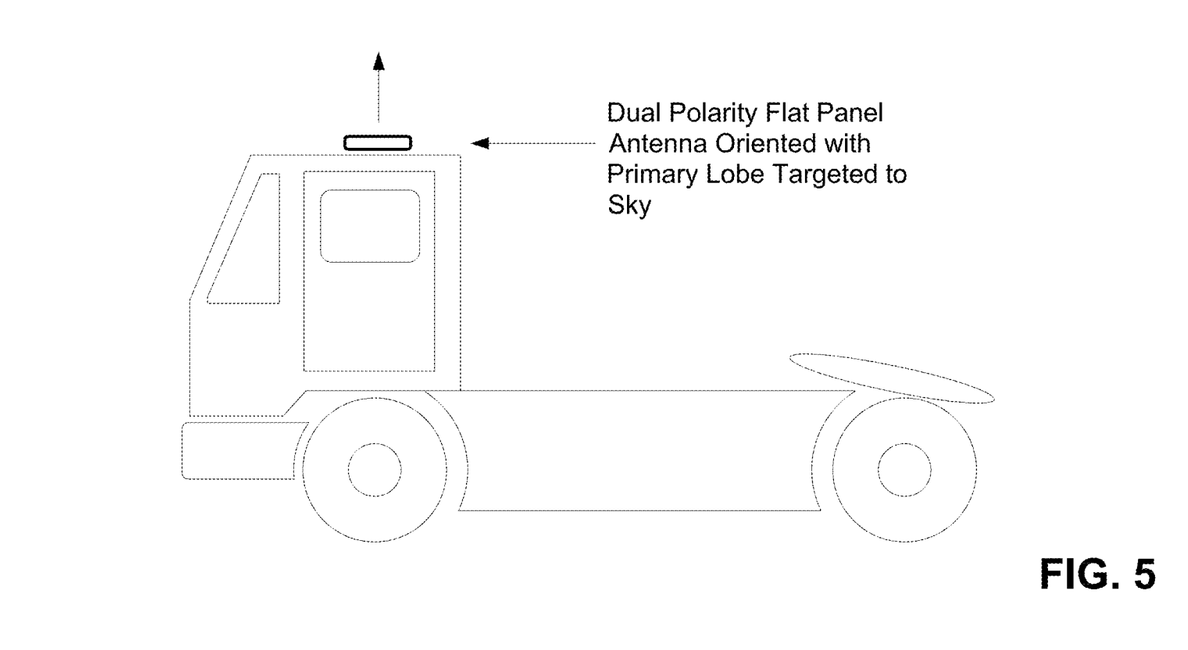
FIG. 5 shows an example hosteler vehicle with a roof-mounted flat panel antenna.
Figure 7:
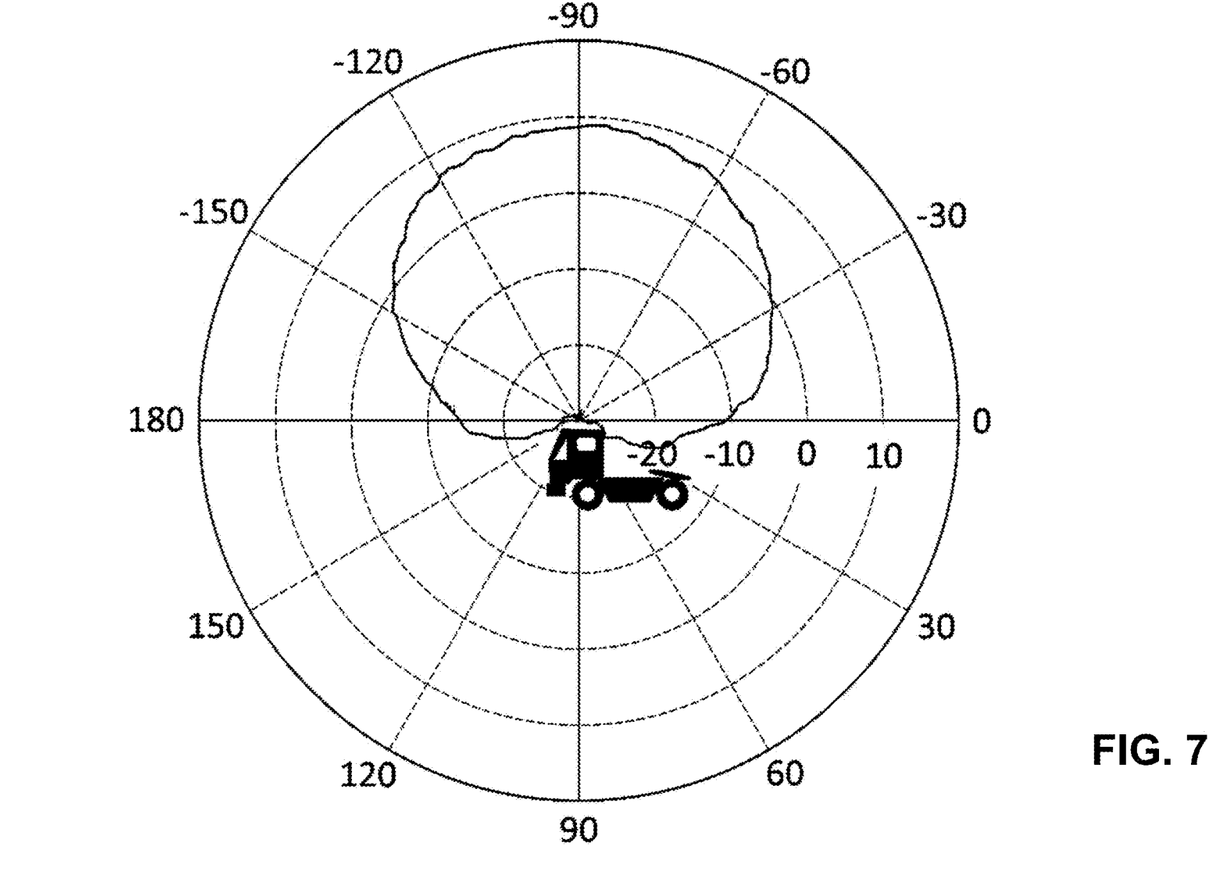
FIG. 7 is a Smith chart of an example radiation pattern of a hosteler roof top mobile antenna.
Figure 9:
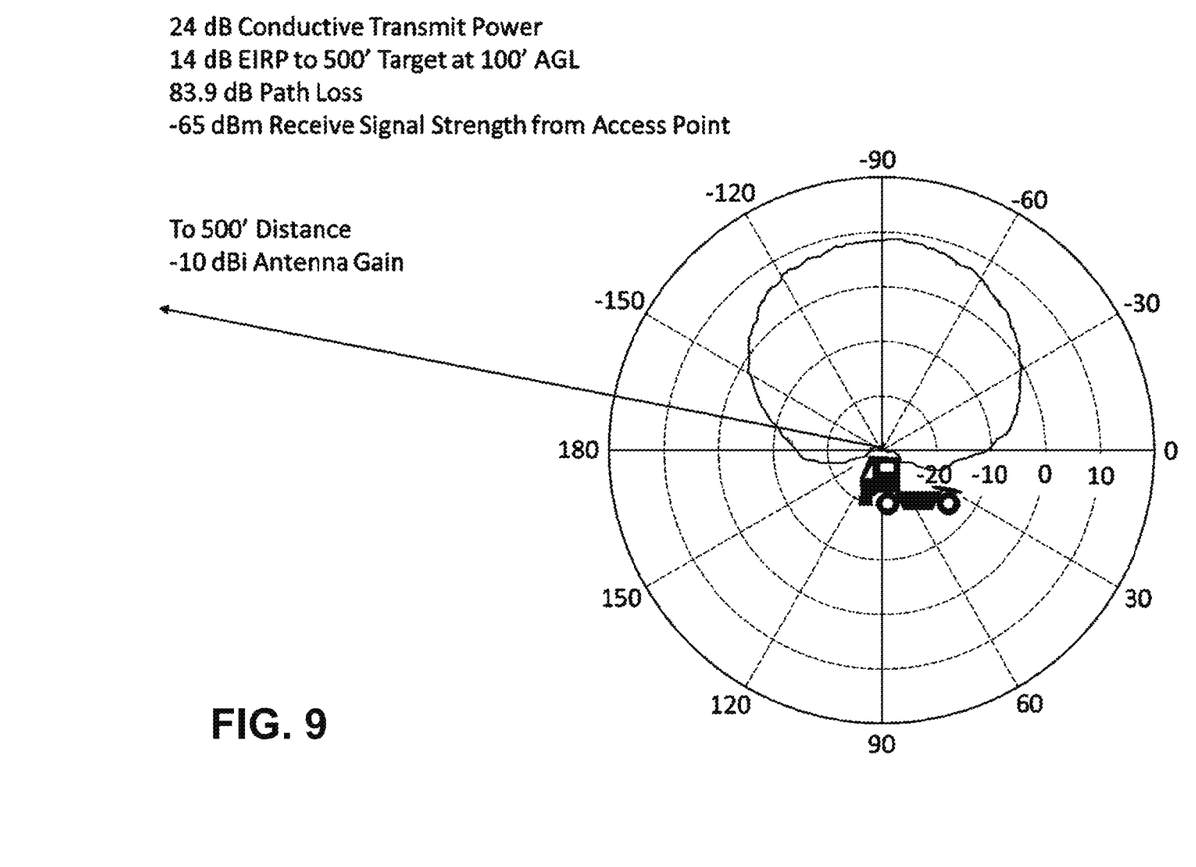
Figure 10B:
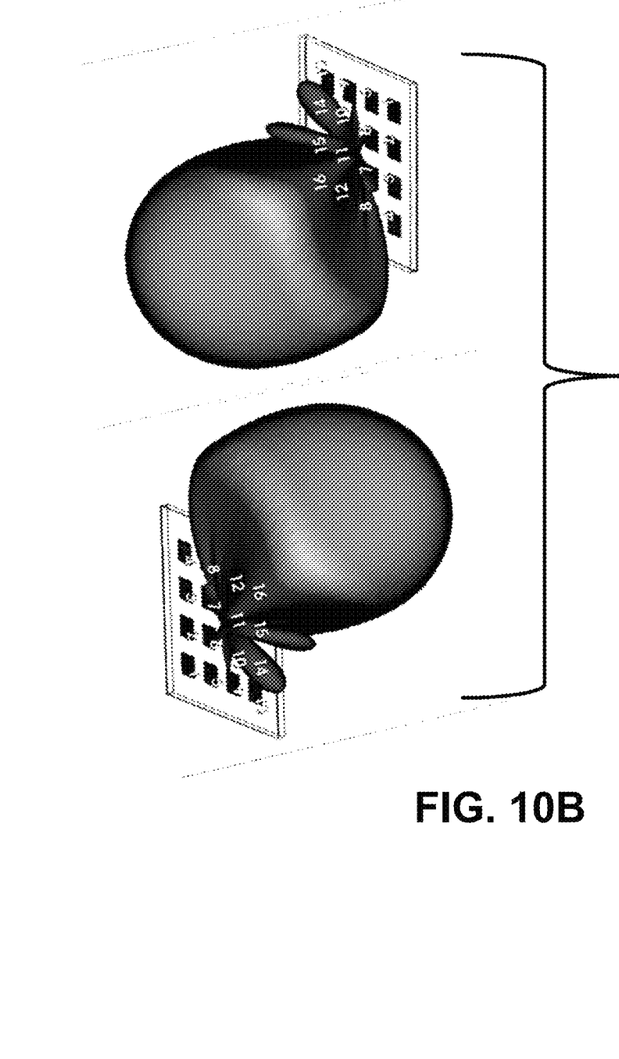
FIG. 10B show example orientations of an access point 16-element MIMO patch antenna array communicating with a 16-element MIMO mobile antenna patch antenna array.

Meanwhile, FIG. 5 shows an example mobile vehicle such as an in-yard transport vehicle (hosteler) is equipped with a roof-mounted skyward looking antenna such as a dual polarity flat panel antenna oriented with a primary lobe targeted to the sky. FIG. 7 shows an example Smith chart indicative of an exemplary radiation pattern of the mobile antenna, and FIG. 9 shows example parameters for the mobile antenna communicating with the mast-mounted access point 103 (e.g., 24 dB conductive transmit power, 14 dB EIP to 500 foot target at 100 foot AGL, 83.9 dB path loss, and −65 dBm receive signal strength from access point). In example embodiments, the line of sight communications between the mast-mounted access point 103 and a dual polarity skyward-pointing flat panel mobile antenna is at least 500 feet with −10 dBi antenna gain. The dual-polarity MIMO antenna array of a modern 802.11n or 802.11ac (as of this writing) WiFi STA provides for 360 degree beamforming that will automatically focus communications between the mobile and access point antennas. In particular, in one embodiment the access point 103 has an antenna array that provides both horizontal and vertical polarization, and the mobile antenna array mounted on the hosteler of FIG. 5 also provides horizontal and vertical polarization but both antenna arrays are reoriented 90 degrees from their typical orientations so that the access point antenna array points directly downwards and the hosteler-mounted antenna array points directly upwards to thereby provide excellent transmission between the two antenna arrays with 360-degree beamforming capability to accommodate any lateral or azimuth position (North-South and East-West) of the hosteler relative to the mast-mounted access point 103. Because both the MIMO transmitting array and the MIMO receiving array each are dual-polarization antenna arrays, the path loss is independent of polarization and the received signal strength remains constant regardless of polarization. See FIGS. 10A, 10B for examples respectively of a 4×4 MIMO antenna array (16 patch elements) oriented 90 degrees away from the earth's horizon; and a depiction of beam-steered primary lobes (one aiming straight up, the other aiming straight down) of two such antenna MIMO arrays each oriented 90 degrees away from the earth's horizon—one of which is on a vehicle and beaming skyward and another of which is at or near the top of a mast 10 and beaming downward towards the earth. The respective high gain beam steering up into the sky (from the mobile station) and downward towards the ground (from the mast-mounted elevated access point 103) ensures that most of the radiated power of a multistream MIMO (multiple-input multiple-output) transmission is directed in the desired direction toward the other station. Furthermore, the reorientation of both antenna arrays as compared to the conventional orientation of such antenna arrays in other terrestrial or mobile WiFi nodes significantly reduces the interference from other nearby networks and transceivers.

This extremely focused communications pattern between the mast-mounted access point 103 and the vehicle-mounted skyward-looking antenna provides an interference-free communication/connection between WiFi mobile stations on the ground and access points 103 on the masts 10, and also allows the access points to dynamically handoff connections to one another as the mobile stations move between masts 10 thus forcing the mobile stations to roam to a better signal source.

For more information concerning MIMO transmission and beamforming, please refer to Part 11: Wireless LAN Medium Access Control (MAC) and Physical Layer (PHY) Specifications Amendment 4: Enhancements for Very High Throughput for Operation in Bands below 6 GHz, IEEE Standard for Information technology— Telecommunications and information exchange between systems Local and metropolitan area networks— Specific requirements, IEEE Computer Society IEEE Std 802.11ac™-20 (2013) and IEEE Std 802.11™-2016 and successor documentation, incorporated herein by reference.

For the purpose of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

The invention claimed is:

1. A kit comprising:
a housing;
a rotatable split yoke connected to mount the housing onto a horizontal lighting spoke pipe of a hub ring of a high mast configured to support a high mast lighting apparatus, the rotatable split yoke being adapted and configured to be fastened onto and retained by the horizontal lighting spoke pipe;
a power interface that interfaces with 480 VAC power the high mast provides to the high mast lighting apparatus, the power interface including a voltage downconverter that steps down the 480 VAC power supplied by the high mast to a battery charging voltage;
at least one battery disposed in the housing, the at least one battery being connected to charge in response to the battery charging voltage; and
a MIMO-based wireless access point mounted in or on the housing, the MIMO-based wireless access point including a radio transceiver connected to a directional antenna array, the directional antenna array oriented to exhibit a radiation pattern having a major lobe that points down to the earth when the rotatable split yoke is fastened onto and retained by the horizontal lighting spoke pipe.

2. The kit of claim 1 wherein the MIMO-based wireless access point comprises an 802.11 access point.

3. The kit of claim 1 wherein the directional antenna array comprises a multi-element antenna array.

4. The kit of claim 1 wherein the power interface includes a step-down transformer external of the housing.

5. The kit of claim 1 wherein the split ring yoke is configured to mount onto a 2-inch spoke pipe.

6. The kit of claim 1 further including a mesh network transceiver providing a backhaul connection.

7. The kit of claim 1 further including a telemetry receiver operable to provide remote control over at least the power interface.

8. The kit of claim 1 further comprising a camera mounted to the housing, and a mounting bracket that mounts the access point so that the camera does not shadow the radiation pattern of the access point.

9. The kit of claim 1 wherein the at least one battery is configured to provide power to the access point even when the power of the high mast lighting apparatus is off.

10. The kit of claim 1 further including a dual polarity flat panel mobile antenna configured to be mounted onto a roof of a vehicle to provide a skyward looking beam radiation pattern.

11. A high mast lighting system comprising:
a high mast including a hub ring having a horizontal lighting spoke pipe, the high mast providing 480 VAC power to a high mast lighting fixture;
a housing supported by a rotatable split yoke that is configured to mount to and be retained by the horizontal lighting spoke pipe;
a power interface including a voltage downconverter configured to step down the 480 VAC power supplied by the high mast, the power interface generating a battery charging voltage from the provided 480 VAC power;
a battery disposed within the housing and connected to be charged by the battery charging voltage; and
a wireless network WiFi transceiver mounted in or on the housing and including a directional antenna array that is oriented to exhibit a WiFi radiation pattern having a major lobe that points directly downward toward the earth when the rotatable split yoke is mounted onto and retained by the horizontal lighting spoke pipe.

12. The high mast lighting system of claim 11 wherein the wireless network WiFi transceiver comprises an 802.11 access point.

13. The high mast lighting system of claim 11 wherein the directional antenna array comprises a multi-element antenna array.

14. The high mast lighting system of claim 11 wherein the power interface includes a stepdown transformer external of the housing.

15. The high mast lighting system of claim 11 wherein the split ring yoke is configured to mount onto a 2-inch spoke pipe.

16. The high mast lighting system of claim 11 further including a mesh network transceiver providing a backhaul connection.

17. The high mast lighting system of claim 11 further including a telemetry receiver operable to provide remote control over at least the power interface.

18. The high mast lighting system of claim 11 further comprising a camera mounted to the housing, and a mounting bracket that mounts the transceiver so the camera does not shadow the radiation pattern of the transceiver.

19. The high mast lighting system of claim 11 wherein the battery is configured to provide power to the transceiver even when the power of the high mast lighting apparatus is off.

20. The high mast lighting system of claim 11 further including a dual polarity flat panel mobile antenna configured to be mounted onto a roof of a vehicle to provide a skyward looking beam radiation pattern.

* * * * *